April 27, 1965     A. G. LLOYD     3,181,085
DIRECT-CURRENT TO ALTERNATING-CURRENT INVERTER
Filed Oct. 12, 1961     2 Sheets-Sheet 1
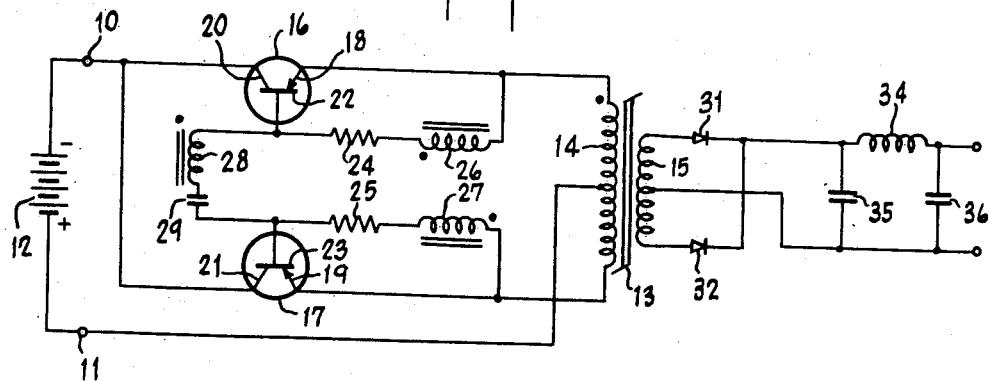
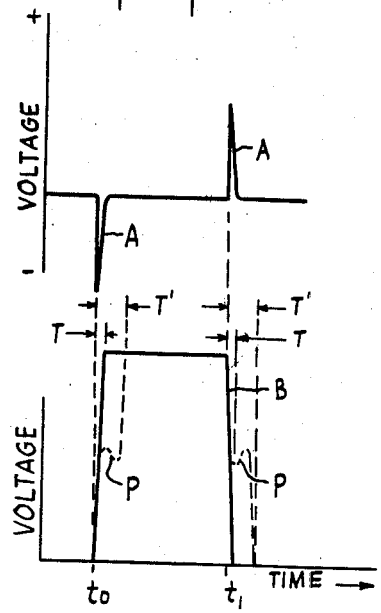
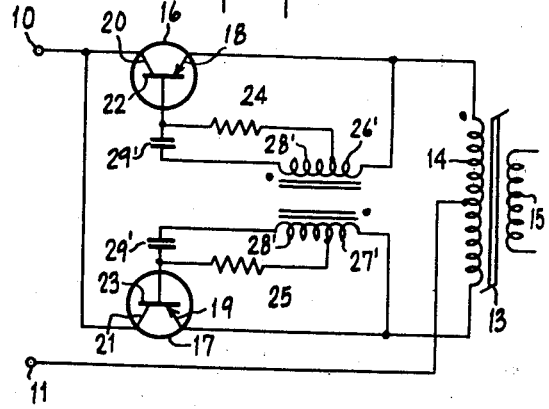
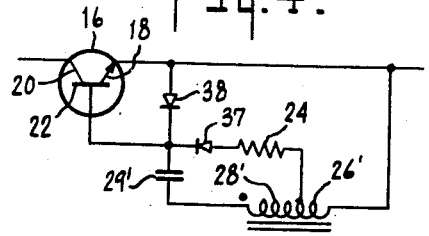
INVENTOR.
ALLAN G. LLOYD
BY John A. Harvey
ATTORNEY April 27, 1965

A. G. LLOYD 3,181,085

DIRECT-CURRENT TO ALTERNATING-CURRENT INVERTER

Filed Oct. 12, 1961

INVENTOR.
ALLAN G. LLOYD
BY
John A. Harvey
ATTORNEY

United States Patent Office 3,181,085
Patented Apr. 27, 1965

3,181,085
DIRECT-CURRENT TO ALTERNATING-CURRENT INVERTER
Allan G. Lloyd, Newark, N.J., assignor, by mesne assignments, to General Mills, Inc., Minneapolis, Minn., a corporation of Delaware
Filed Oct. 12, 1961, Ser. No. 149,143
16 Claims. (Cl. 331—113)

The present invention relates to direct-current to alternating-current inverters, and, particularly, to inverters of the type using transistors to control energization of a saturable core transformer.

The present application is a continuation-in-part of application Serial Number 62,198, filed October 12, 1960, now abandoned, and entitled Direct-Current to Alternating-Current Converter.

One widely used form of direct-current to alternating-current inverter utilizes a magnetically saturable core transformer having a secondary winding in which the alternating current is generated by alternating the polarity of unidirectional energization of a primary winding from a unidirectional power source. This alternate polarity energization of the primary winding is accomplished by use of two transistors which couple the unidirectional source to the transformer primary winding and are alternately rendered conductive by individual regenerative feedback voltages of pulse wave form derived in response to the transformer energization. These feedback voltages, generated with opposite relative phase, have the same pulse periodicity and have a pulse duration established by the time required for the transformer core to change from magnetic saturation of one polarity to magnetic saturation of opposite polarity as the primary winding of the transformer is energized by the conductive state of alternate ones of the transistors.

Theoretically, the pulses of each of these feedback voltages should have perfectly rectangular wave form with infinitely steep leading and lagging edges. In practice, however, both the leading and lagging edges of the pulses have been found to exhibit a finite slope such that there is a ten to twenty micro-second delay before the pulse reaches its maximum amplitude or decreases to minimum amplitude. Such delay is particularly prevalent in inverters using saturable core material and operating at a frequency of the order of fifteen hundred cycles. It may be explained by the fact that the remanent flux of the core is very nearly equal to the saturating value of flux so that these cores are characterized by very small values of magnetic energy return. Also such transformers use a relatively few number of turns, and this fact considered in the light of the small value of delta-flux available results in the switching time delay. This ten to twenty micro-second switching time increases the dissipation of the particular transistor which is becoming conductive under control of the feedback pulse, particularly in that during this time delay the transistor has a large voltage appearing across its emitter and collector terminals and is conducting appreciable values of current. Any decrease of this switching time reduces the transistor dissipation and increases the system efficiency. Further, both the leading and lagging edges of the feedback pulses often exhibit transient wave form disturbances (often called transient wave form "notches") at the operating frequencies just mentioned, and these cause additional delays in the pulse rise and fall times. The wave form of the output alternating voltage corresponds, during each half cycle, to the wave form of an individual one of the regenerative feedback pulse voltages so that the finite slopes and transient wave form disturbances appearing in the latter are faithfully reflected in the wave form of the output alternating voltage. These wave-form characteristics appearing in the output alternating potential are undesirable for many applications, especially when this voltage is rectified and supplied to a filter for purposes of deriving a unidirectional voltage of amplitude different from that of the input unidirectional voltage.

The regenerative feedback pulse voltages are supplied in practice through individual current limiting resistors to the base electrode of the alternately conducting transistors to control their alternate periods of conductivity. It has been proposed that the output voltage wave form be improved by use of by-pass condensers connected in parallel with each of the feedback circuit resistors effectively to remove them from the feedback circuit during the initial period of ten to twenty micro-seconds when each transistor changes from its non-conductive to its conductive state. While the use of such condensers does shorten the effective pulse rise and fall times, and thus reduces the slope of the output voltage wave form at the beginning and end of each half cycle, nevertheless an appreciable amount of feedback pulse rise and fall time and transient wave form disturbance remains so that use of these prior inverters with rectifier and filter systems dictates the use of by-pass filter condensers of large value and resultant large physical size.

It is an object of the invention to provide a new and improved direct-current to alternating-current inverter which avoids one or more of the disadvantages and limitations of prior such inverters.

It is a further object of the invention to provide a direct-current to alternating-current inverter in which the generated alternating voltage wave form more nearly approaches the rectangular wave form desired in many applications and is relatively free of transient amplitude disturbances.

It is an additional object of the invention to provide a novel direct-current to alternating-current inverter having improved performance and operational efficiency.

It is yet a further object of the invention to provide an improved direct-current to alternating-current inverter characterized in operation by substantially reduced transistor peak dissipation caused by switching transients.

Other objects and advantages of the invention will appear as the detailed description thereof proceeds in the light of the drawings forming a part of this application and in which:

FIG. 1 is a circuit diagram of a direct-current to alternating-current inverter embodying the present invention in a particular form;

FIG. 2 graphically represents certain operating characteristics of the FIG. 1 system and is used as an aid in explaining its operation;

FIG. 3 is a circuit diagram of a direct-current to alternating-current inverter embodying the present invention in a modified form;

FIG. 4 is a circuit diagram of a portion of an inverter and shows a modification suitable for use in an inverter of the FIG. 3 type.

Figure 5:
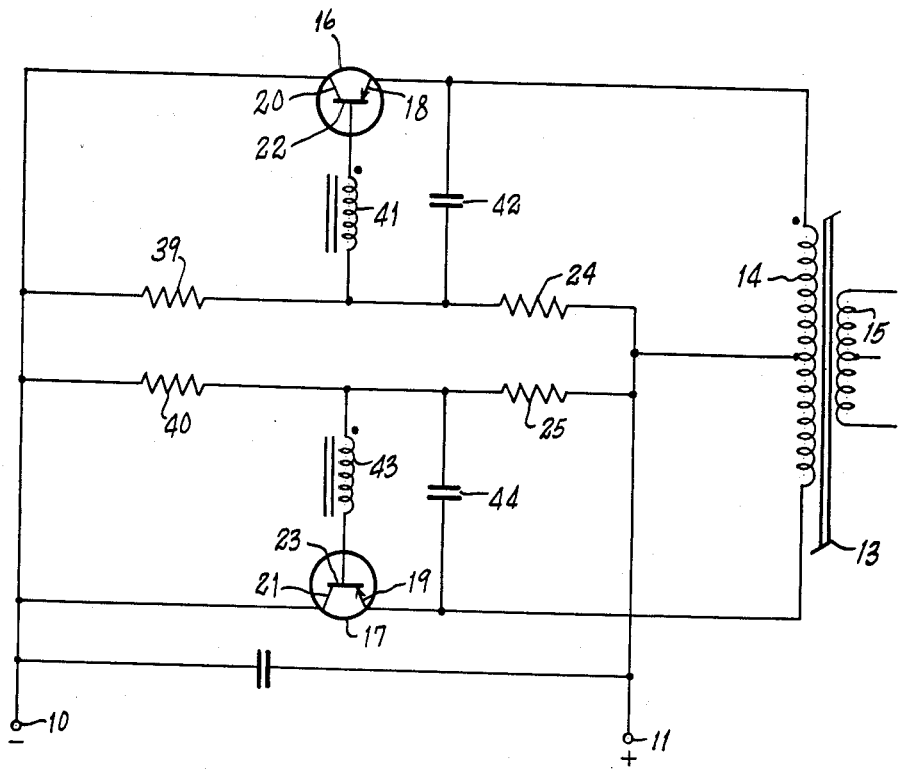
FIG. 5 is a circuit diagram of a direct-current to alternating-current inverter embodying the present invention in an additionally modified form particularly suitable for relatively low values of unidirectional energization.

Referring now more particularly to FIG. 1, the inverter includes an input circuit represented by input circuit terminals 10 and 11 for energization from a unidirectional power source shown by way of illustration as a battery 12 and includes an output circuit transformer 13 having a center tapped primary winding 14 and a center tapped secondary winding 15. A pair of PNP transistor conductance control devices 16 and 17 have their respective emitter electrodes 18, 19 and respective collector electrodes 20 and 21 arranged as shown to provide unidirectional coupling of individual halves of the transformer primary winding 14 through the input circuit 10, 11 to the unidirectional power source 12. It will be noted that the coupling thus provided by the transistors 16 and 17 is such that the transistor 16 effects energization of the transformer winding 14 from the source 12 with a polarity of energization opposite to that effected by the transistor 17.

The transistors 16 and 17 have respective base electrodes 22 and 23 which are individually energized by respective current-limiting resistors 24 and 25 and by respective transformer windings 26 and 27 which are magnetically coupled to the winding 14 and may be individual windings or terminal end portions of the latter. As indicated in conventional manner by the polarity dots associated with each of the windings 14, 26 and 27, the voltages developed in the transformer windings 26 and 27 have regenerative polarity. Thus if it be assumed that when the source 12 is first connected to the input terminals 10 and 11 the transistor 16 becomes conductive before the transistor 17, the resultant energization of the transformer primary winding 14 causes a voltage to be developed in the transformer winding 26 of such polarity that the base electrode 22 of the transistor 16 becomes negative with respect to its emitter electrode 18. The transistor 16 is thereby rendered more conductive, and this increases the energization of the transformer winding 14 and the magnitude of the regenerative feedback voltage in the transformer winding 26. This action is cumulative and quickly renders the transistor 16 fully conductive to cause the full voltage of the source 12 to be applied to the upper half of the transformer winding 14.

The energizing current through the transformer winding 14 maintains constant value during the time interval required for the core of the transformer to change from its previous magnetic saturation in one polarity to magnetic saturation in opposite polarity, after which the magnetic flux produced in the core by energization of the winding 14 remains constant. Since the voltage developed in the transformer winding 26 has an amplitude varying with the rate of change of magnetic flux produced by the winding 14, ultimate saturation of the core of the transformer 13 as last mentioned causes the amplitude of the voltage developed in the transformer winding 26 to decrease. This decreases the conductivity of the transistor 16 and reduces the energizing current supplied from the source 12 to the transformer winding 14. The magnetic field produced by the latter now collapses and induces a voltage in the transformer winding 26 having a polarity which quickly renders the transistor 16 nonconductive.

At the time the transistor 16 became increasingly conductive and supplied energizing current from the source 12 to the transformer winding 14, a voltage was developed in the transformer winding 27 which tended to render the transistor 17 less conductive. Now when the conductivity of the transistor 16 is terminated as last described, a voltage of regenerative polarity is developed in the transformer winding 27 and this voltage quickly renders the transistor 17 fully conductive to energize the lower half of the transformer primary winding 14 with opposite polarity to its previous energization by the transistor 16. This energization continues until the core of the transformer 13 becomes magnetically saturated in reversed magnetic polarity after which the voltage developed in the transformer winding 27 quickly renders the transistor 17 nonconductive and the voltage developed in the transformer winding 26 quickly renders the transistor device 16 fully conductive to repeat the cycle of operation described.

Since the unidirectional energizing source 12 has a constant terminal voltage and the rate of change of magnetic flux in the transformer core proceeds at a relatively constant rate between its two magnetic polarities of saturation, the voltage pulses developed in the transformer windings 26 and 27 have substantially constant amplitudes throughout the duration of each pulse. That is evident when it is considered that the instantaneous amplitude of the pulse voltage is proportional to the rate of change of magnetic flux produced in the transformed core by energization of the winding 14, so that the essentially constant rate of change of the magnetic flux causes these developed voltages each to be of essentially rectangular pulse wave form. Theoretically the leading and lagging edges of each pulse of these voltages should have infinitely steep wave form, but in practice the inherent circuit and transformer reactances and the response characteristics of the transistors 16 and 17 cause the leading and lagging edges of the regenerative pulse voltages to have an undesirable slope of the order of ten to twenty microseconds delay in the rise and fall times of each voltage pulse. In addition, "notches" of tens to hundreds of microseconds duration may appear in the pulse voltage wave form because of sluggish transistor switching due to a combination of transistor switching delay time and low energy return from the square-loop hysteresis character of saturable core material as earlier mentioned.

In accordance with the present invention, the transformer 13 is provided with a winding 28 which is coupled through a condenser 29 between the base electrode 22 of the transistor 16 and the base electrode 23 of the transistor 17. The voltage developed in the winding 28 has regenerative polarity with respect to the transistors 16 and 17, and has a magnitude of the order of one and a half to two times larger than the magnitude of the voltage developed between the end terminals of the transformer winding 14. The condenser 29 has a value selected such that the voltage developed in the transformer winding 28 is differentiated. This differentiated voltage has the wave form represented by curve A of FIG. 2, which represents the differentiated voltage applied to the base electrode 22 of the transistor 16 but has opposite polarity with respect to the base electrode of the transistor 17. It will be seen that this differentiated voltage has a large negative-polarity pulse component which is developed as soon as the transistor 16 begins to become conductive and has the effect of almost immediately equalizing the voltages of the base electrode 22 and collector electrode 20 of the transistor 16 so that the latter is immediately rendered fully conductive by this pulse voltage component. Thus the pulse voltage developed by differentiation of the voltage developed in the transformer winding 28 has the effect of very substantially reducing, to the value of two to five microseconds, the time interval before the full voltage of the source 12 is applied to the transformer primary winding 14.

The differentiated voltage pulse applied with regenerative polarity to the base electrode 22 of the transistor 16 as last described is concurrently applied as a degenerative voltage to the base electrode 23 of the transistor 17 to cause the latter to be rendered nonconductive more quickly. On the alternate half cycle the differentiated voltage pulse is applied with regenerative polarity to the base electrode 23 of the transistor 17 to render the latter more quickly fully conductive, and is concurrently applied with degenerative polarity to the base electrode 22 of the transistor 16 to render the latter nonconductive more quickly.

One half cycle of the voltage developed across one transistor is represented graphically by curve B of FIG. 2 and it will be evident that the rise and fall times T of this voltage are greatly shortened with respect to prior such arrangements which are characterized by a wave form represented by the broken line portions of curve B and having much longer rise and fall times shown as T'. In this respect, it may be noted that the prior arrangements are characterized by a transient amplitude disturbance in their rise and fall times as represented by the S-shaped wave form portions P and these transient disturbances themselves substantially prolonged the rise and fall times of each half cycle of the generated output voltage. In contrast, it has been found that an inverter embodying the present invention generates an output voltage having a wave form quite free of any such transient amplitude disturbances so that the wave form of this voltage approaches very closely to the theoretically ideal rectangular wave form. This is especially advantageous when the inverter is used with a rectifier and filter system as shown in FIG. 1, the output voltage of the transformer secondary winding 15 being rectified by a full wave rectifier comprising the diode rectifiers 31, 32 and being then filtered by a filter including a series filter choke 34 and shunt filter condensers 35 and 36, to develop a unidirectional output voltage differing in magnitude from the voltage of the unidirectional source 12.

A direct-current to alternating-current inverter embodying the present invention in a modified form is shown in FIG. 3, which is essentially similar to the FIG. 1 arrangement and similar circuit components are designated by similar reference numerals whereas analogous components are designated by similar reference numerals primed. In the present arrangement the transformer windings 26' and 27', which correspond to the respective windings 26 and 27 of the FIG. 1 arrangement, are electrically connected as shown to a winding 28' which corresponds to and has the same function as the winding 28 of the FIG. 1 arrangement. The transformer windings 28', like the arrangement of FIG. 1, are coupled through individual condensers 29' to the base electrodes 22 and 23 of the transistors 16 and 17. In this instance, however, the entire voltage developed across the winding portions 26' and 28' on the one hand and 27' and 28' on the other hand are differentiated by their associated condensers 29' to apply a differentiated pulse voltage between the base electrode and emitter electrode of each transistor and thereby effect rapid turn On and turn Off of the transistor in the same manner as explained with reference to the FIG. 1 arrangement. The transformer windings 26', 27' and each of the transformer windings 28' may, if desired, be end winding portions of the transformer primary winding 14. Aside from the fact that a differentiated pulse voltage is now developed and applied individually to the transistors 16 and 17 to control their conductive states, the operation of the FIG. 3 arrangement is the same as that described for the FIG. 1 arrangement.

FIG. 4 is a circuit diagram representing a portion of an inverter and shows a modification suitable for use in the FIG. 3 inverter arrangement. The transistors used in this modification are of the NPN type. For simplicity of description, the arrangement is shown as embodied in the FIG. 3 inverter in association with the transistor 16 but it will be understood that a similar circuit arrangement is used for the transistor 17 of FIG. 3. In this modified arrangement, the transformer winding portion 26' is coupled to the base electrode 22 of the transistor 16 through the resistor 24 and a unidirectional conductive diode 37 and the emitter electrode 18 and base electrode 22 of the transistor 16 are directly coupled by a unidirectional conductive diode 38. The unidirectional conductive diode 37 prevents the charging current of the condenser 29' from flowing back through the resistor 24 at the time the differentiated pulse voltage is developed and applied to the base electrode 22 of the transistor 16 to turn the latter On, so that all of the charging current of the condenser 29 is supplied as a control current to the base electrode 22. The unidirectional conductive diode 38 prevents the application of an excessive reverse voltage between the emitter electrode 18 and base electrode 22 of the transistor 16 at the time the condenser 29 discharges in producing a differentiated voltage pulse at the end of the period of conductivity of the transistor 16 and effective to turn the latter Off. The unidirectional conductive diode 38 also provides a reverse charging path for the condenser 29' at the time the latter voltage pulse is developed. The use of unidirectional conductive diode 38 is optional but is advisable when the transistors used in the inverter are of the silicon transistor type or are comprised by silicon control rectifier devices.

The inverter arrangement shown in FIG. 5 embodies the present invention in a form particularly suitable for unidirectional energization by a relatively low value of energizing potential of the order of two to four volts as contrasted with the more usual unidirectional energization of the order of 25 volts. The present arrangement includes starting resistors 39 and 40 connected in series with the respective resistors 24 and 25 across the input terminals 10 and 11 of the unidirectional energizing source. The output transformer 13 is provided with a feedback winding 41 connected with regenerative polarity between the base electrode 22 of the transistor 16 and the juncture of the resistors 39 and 24, a condenser 42 being connected between the emitter electrode 18 of the transistor 16 and the juncture of the resistors last mentioned. The output transformer 13 also includes a feedback winding 43 connected with regenerative polarity between the base electrode 23 of the transistor 17 and the juncture of the resistors 25 and 40, a condenser 44 being likewise connected between the juncture of the resistors last mentioned and the emitter electrode 19 of the transistor 17. It is the purpose of the condensers 42 and 44 to effect very rapid transition of their associated transistors between their conductive and non-conductive states. The manner in which this is accomplished will be rendered more apparent if it is assumed by way of example that the transistor 16 is conductive at a given time, the voltage induced in the feedback transformer winding 41 and the counter-voltage developed across the upper half of the primary winding 14 of the output transformer 13 having such polarities under the assumed condition that the condenser 42 is so charged that its upper terminal (connected to the emitter electrode 18) is negative with respect to its lower terminal. Now when the output transformer 13 reaches a state of magnetic saturation, the polarity of the feedback voltage developed in the feedback winding 41 reverses and has additive polarity with respect to the charge potential of the condenser 42. Accordingly this charge potential assists in biasing the base electrode 22 to a large positive potential with respect to the emitter electrode 18, more quickly to render the transistor non-conductive. It may be noted that, under the assumed condition heretofore expressed, the charge potential of the condenser 44 is such that it also has additive polarity at this time with respect to the prevailing regenerative polarity of the feedback winding 43. Thus the charge potential of the condenser 44 and the feedback potential of the winding 43 together cause the base 23 of the transistor 17 to be biased to a large negative potential with respect to its associated emitter electrode 19, and thereby cause the transistor 17 to be quickly rendered fully conductive.

It will accordingly be apparent that in the FIG. 5 inverter the charge potentials develop across the terminals of the condensers 42 and 44, during the conductive and non-conductive states of their associated transistors 16 and 17, respectively, substantially improve the rapidity with which the transistors alternately change between their conductive and non-conductive states. There is a further operational advantage inherent in the present inverter arrangement. This concerns its higher operational efficiency as compared to prior inverters using starting resistors. Heretofore it has been conventional to connect each starting resistor between the base and collector elecrodes of an associated transistor so that the voltage impressed across the starting resistor in the absence of conduction of the associated transistor is twice the value of the input energizing voltage. The present arrangement connects the starting resistors 39 and 40 in series with the base current-limiting resistors 24 and 25 across the input energizing voltage so that the voltage impressed across each starting resistor has a value approximately equal to the value of input energizing voltage. Since the power consumed by each starting resistor is directly proportional to the square of the voltage impressed across it and is inversely proportional to the value of resistance of the starting resistor, it will be apparent that the power consumed by each starting resistor in the present arrangement is approximately one-fourth that consumed by starting resistors heretofore conventionally connected between the emitter and base electrodes of an associated transistor as earlier described. Thus the present inverter accomplishes more rapid transition between alternate conductive and non-conductive states of the transistors used in the inverter, and does so without the need for any circuit components additional to those heretofore conventionally used in prior inverter arrangements. This improved operation is accompanied by improved operational efficiency by reason of the substantially reduced power consumption of the starting resistors which are employed to insure a consistent and rapid initiation of the state of oscillation of the inverter each time it is initially energized.

It will be apparent from the foregoing description of the invention that a direct-current to alternating-current inverter embodying the invention is characterized by substantially improved output voltage wave form having substantially more rapid change between positive to negative amplitudes at the end of each half cycle thereof and thus one exhibiting a highly desired rectangular wave form substantially free of transient wave form disturbances. The invention accordingly improves the operational efficiency and enhances the inverter for many applications as, for example, in direct-current to direct-current inversion systems.

While a specific form of invention has been described for purposes of illustration, it is contemplated that numerous changes may be made without departing from the spirit of the invention.

What is claimed is:

1. A direct-current to alternating-current inverter comprising an input circuit for energization with unidirectional power and a saturable core output transformer having an energizing winding and providing an alternating current output circuit, a pair of conductance control devices having conductance terminals providing unidirectional coupling of said winding to said input circuit with a polarity of coupling by one of said devices opposite to that of the other and each having a conductance control terminal, means for energizing each said conductance control terminal with a regenerative-polarity pulse voltage which varies in instantaneous amplitude with the rate of change of magnetic flux produced by energization of said winding, and means for additionally energizing each said conductance control terminal with a regenerative-polarity pulse voltage which varies in instantaneous amplitude with the differentiated rate of said change of magnetic flux.

2. A direct-current to alternating-current inverter comprising an input circuit for energization with unidirectional power and a saturable core output transformer having an energizing winding and providing an alternating-current output circuit, a pair of conductance control devices having conductance terminals providing unidirectional coupling of said winding to said input circuit with a polarity of coupling by one of said devices opposite to that of the other and each having a conductance control terminal, means for energizing each said conductance control terminal with a first regenerative-polarity pulse voltage which varies in instantaneous amplitude with the rate of change of magnetic flux produced by energization of said winding, and means for additionally energizing each said conductance control terminal with a regenerative-polarity pulse voltage which has substantially larger amplitude than said first voltage and varies with the differentiated rate of said change of magnetic flux.

3. A direct-current to alternating-current inverter comprising an input circuit for energization with unidirectional power and a saturable core output transformer having an energizing winding and providing an alternating-current output circuit, a pair of conductance control devices having conductance terminals providing unidirectional coupling of said winding to said input circuit with a polarity of coupling by one of said devices opposite to that of the other and each having a conductance control terminal, means for energizing said conductance control terminals with at least one regenerative-polarity voltage produced by unidirectional energization of said winding, and means for energizing said conductance control terminals with regenerative-polarity energy produced by differentiation of at least one voltage derived from unidirectional energization of said winding.

4. A direct-current to alternating-current inverter comprising an input circuit for energization with unidirectional power and a saturable core output transformer having an energizing winding and providing an alternating-current output circuit, a pair of conductance control devices having conductance terminals providing unidirectional coupling of said winding to said input circuit with a polarity of coupling by one of said devices opposite to that of the other and each having a conductance control terminal, at least one transformer winding portion for energizing said conductance control terminals with at least one regenerative-polarity voltage produced by unidirectional energization of said energizing winding, and at least one transformer winding portion for energizing said conductance control terminals with regenerative-polarity energy produced by differentiation of at least one voltage derived from unidirectional energization of said energizing winding.

5. A direct-current to alternating-current inverter comprising an input circuit for energization with unidirectional power and an output transformer having an energizing winding and providing an alternating-current output circuit, a pair of conductance control devices having conductance terminals providing unidirectional coupling of said winding to said input circuit with a polarity of coupling by one of said devices opposite to that of the other and each having a conductance control terminal, means for energizing said conductance control terminals with at least one regenerative-polarity voltage produced by unidirectional energization of said winding, and means for energizing said conductance control terminals with regenerative-polarity energy produced by differentiation of at least one voltage having a magnitude substantially larger than each said first mentioned voltage and derived from unidirectional energization of said winding.

6. A direct-current to alternating-current inverter comprising an input circuit for energization with unidirectional power and an output transformer having an energizing winding and providing an alternating-current output circuit, a pair of conductance control devices having conductance terminals providing unidirectional coupling of said winding to said input circuit with a polarity of coupling by one of said devices opposite to that of the other and each having a conductance control terminal, at least one transformer winding portion for energizing said conductance control terminals with at least one regenerative-polarity voltage produced by unidirectional energization of said energizing winding, a condenser, and a winding on said transformer serially connected with said condenser between said conductance control terminals for energization thereof by regenerative-polarity pulse voltages having pulse durations short in relation to the pulse interval.

7. A direct-current to alternating-current inverter comprising an input circuit for energization with unidirectional power and an output transformer having output and energizing windings and a magnetically saturable core, transistors having emitter and collector electrodes coupling said energizing winding to said input circuit with a polarity of coupling by one of said transistors opposite to that of the other and each having a conductance control electrode, means for energizing each said conductance control electrode with a regenerative-polarity pulse voltage which has a magnitude sufficient to effect magnetic saturation of said core by energization of said energizing winding through said transistors and varies in instantaneous amplitude with the rate of change of the magnetic flux thereby produced, and means for additionally energizing each said conductance control electrode with a regenerative-polarity pulse voltage which varies in instantaneous amplitude with the differentiated rate of said change of magnetic flux.

8. A direct-current to alternating-current inverter comprising an input circuit for energization with unidirectional power and an output transformer having output and energizing windings and a magnetically saturable core, transistors having emitter and collector electrodes providing unidirectional coupling of said energizing winding to said input circuit with a polarity of coupling by one of said transistors opposite to that of the other and each having a conductance control electrode, at least one transformer winding portion for energizing each said conductance control electrode with a regenerative-polarity pulse voltage produced by unidirectional energization of said energizing winding and of sufficient magnitude to effect magnetic saturation of said core, and at least one transformer winding portion for energizing said conductance control electrodes with regenerative-polarity energy produced by differentiation of at least one voltage derived from unidirectional energization of said energizing winding.

9. A direct-current to alternating-current inverter comprising an input circuit for energization with unidirectional power and an output transformer having output and energizing windings and a magnetically saturable core, transistors having emitter and collector electrodes coupling said energizing winding to said input circuit with a polarity of coupling by one of said transistors opposite to that of the other and each having a conductance controlled electrode, at least one transformer winding portion for energizing said conductance control electrodes with at least one regenerative-polarity pulse voltage produced by unidirectional energization of said energizing winding and of a magnitude sufficient to effect magnetic saturation of said core by said energization of said energizing winding, a condenser, and a winding on said transformer serially connected with said condenser between said conductance control electrodes of said transistors for energization thereof by regenerative-polarity pulse voltages having pulse durations short in relation to the pulse interval.

10. A direct-current to alternating-current inverter comprising an input circuit for energization with unidirectional power and an output transformer having output and energizing windings and a magnetically saturable core, transistors having emitter and collector electrodes coupling said energizing winding to said input circuit with a polarity of coupling by one of said transistors opposite to that of the other and each having a base control electrode, a transformer winding portion connected between the emitter and base electrode of each of said transistors for energizing said base electrodes with regenerative-polarity pulse voltages of magnitude sufficient to effect magnetic saturation of said core by energization of said energizing winding through said transistors, and at least one transformer winding portion and a condenser in series therewith for energizing said base electrodes with a regenerative-polarity pulse potential produced by energization of said energizing winding and having an instantaneous amplitude varying with the differentiated rate of change of magnetic flux developed in said transformer core.

11. A direct-current to alternating-current inverter comprising an input circuit for energization with unidirectional power and an output transformer having output and energizing windings and a magnetically saturable core, transistors having emitter and collector electrodes coupling said energizing winding to said input circuit with a polarity of coupling by one of said transistors opposite to that of the other and each having a base control electrode, low-voltage transformer winding portions individual to said transistors and connected between the emitter and base electrode thereof for energizing said base electrode with relatively low amplitude regenerative-polarity pulse voltages to effect magnetic saturation of said core by energization of said energizing winding through said transistors, a plurality of condensers, and higher-voltage transformer winding portions individual to said transistors and coupled by individual ones of said condensers between the emitter and base electrode thereof for energizing said base electrodes with regenerative-polarity pulse potentials produced by energization of said energizing winding and having instantaneous amplitudes varying with the differentiated rate of change of magnetic flux developed in said transformer core.

12. A direct-current to alternating-current inverter comprising an input circuit for energization with unidirectional power and an output transformer having output and energizing windings and a magnetically saturable core, transistors having emitter and collector electrodes coupling said energizing winding to said input circuit with a polarity of coupling by one of said transistors opposite to that of the other and each having a base control electrode, a plurality of unidirectional conductive devices, low-voltage transformer winding portions individual to said transistors and coupled through individual ones of said devices between the emitter and base electrode thereof for energizing said base electrodes with relatively low amplitude regenerative-polarity pulse voltages to effect magnetic saturation of said core by energization of said energizing winding through said transistors, a plurality of condensers, and higher-voltage transformer winding portions individual to said transistors and coupled by individual ones of said condensers between the emitter and base electrode thereof for energizing said base electrodes with regenerative-polarity pulse potentials produced by energization of said energizing winding and having instantaneous amplitudes varying with the differentiated rate of change of magnetic flux developed in said transformer core.

13. A direct-current to alternating-current inverter comprising an input circuit for energization with unidirectional power and an output transformer having output and energizing windings and a magnetically saturable core, transistors having emitter and collector electrodes coupling said energizing winding to said input circuit with a polarity of coupling by one of said transistors opposite to that of the other and each having a base control electrode, a diode rectifier connected between the emitter and base control electrode of each of said transistors with a polarity to minimize any reverse bias voltage applied to said base control electrodes, low-voltage transformer winding portions and diode rectifiers individual to said transistors and serially connected between the emitter and base electrode thereof for energizing said base electrodes with relatively low amplitude regenerative-polarity pulse voltages to effect magnetic saturation of said core by energization of said energizing winding through said transistors, and higher-voltage transformer winding portions and coupling condensers individual to said transistors and serially connected between the emitter and base electrode thereof for energizing said base electrodes with regenerative-polarity pulse potentials produced by energization of said energizing winding and having instantaneous amplitudes varying with the differentiated rate of change of magnetic flux developed in said transformer core.

14. A direct-current to alternating-current inverter comprising an input circuit for energization with unidirectional power and a saturable core output transformer having an energizing winding and providing an alternating-current output circuit, a pair of conductance control devices having conductance terminals providing unidirectional coupling of said winding to said input circuit with a polarity of coupling by one of said devices opposite to that of the other and each having a conductance control terminal, a pair of transformer control windings for deriving and applying to each said conductance control terminal individual regenerative polarity pulse voltages in response to the rate of change of magnetic flux produced by energization of said energizing winding, and a pair of voltage differentiating condensers for coupling individual ones of said control windings directly between the conductance control terminal and a conductance terminal of individual ones of said devices for deriving by at least partial differentiation of said pulse voltages and for applying to said conductance control terminals additional regenerative-polarity pulse voltages effective to enhance the rapidity with which each of said devices alternately changes between the conductive and non-conductive states thereof.

15. A direct-current to alternating-current inverter comprising an input circuit for energization with unidirectional power and a saturable core output transformer having an energizing winding and providing an alternating-current output circuit, a pair of transistors having emitter and collector terminals providing unidirectional coupling of said winding to said input circuit with a polarity of coupling by one of said transistors opposite to that of the other and each having a conductance-control base terminal, a pair of transformer regenerative-control feedback windings on said output transformer for energizing each said conductance-control base terminal with a regenerative-polarity pulse voltage developed in response to the rate of change of magnetic flux produced by energization of said energizing winding, and a pair of condensers coupling individual ones of said feed-back windings between the base and emitter terminals of individual ones of said transistors and having relatively small values of capacitance effective to drive and apply between the base and emitter terminals of an associated transistor a pulse-differentiated charge voltage enhancing the rapidity with which each of said transistors alternately changes between the conductive and non-conductive states thereof.

16. A direct-current to alternating-current inverter comprising an input circuit for energization with unidirectional power and a saturable core output transformer having a center-tapped energizing winding with the center tap thereof connected to one side of said input circuit and having an output winding providing an alternating-current output circuit, a pair of transistors having emitter and collector terminals providing unidirectional coupling of the end terminals of said winding to the other side of said input circuit with a polarity of coupling by one of said transistors opposite to that of the other and each having a conductance control base terminal, a pair of transformer regenerative-control feed-back windings on said output transformer for coupling individual ones of said conductance control base terminals to said one side of said input circuit to energize said conductance-control base terminals with regenerative-polarity pulse voltages developed in response to the rate of change of magnetic flux produced by energization of said energizing winding, and a pair of condensers of differentiating capacitance values coupling individual ones of said feed-back windings directly between the base and emitter terminals of individual ones of said transistors for deriving and applying between the base and emitter terminals of an associated transistor a pulse-differentiated charge voltage effective to enhance the rapidity with which each of said transistors alternately changes between the conductive and non-conductive states thereof.

References Cited by the Examiner

UNITED STATES PATENTS

| 2,912,653 | 11/59 | Tillman | 331—113 |
| 2,990,519 | 6/61 | Wagner | 331—113 |
| 3,008,068 | 11/61 | Wilting et al. | 331—113 |

ROY LAKE, *Primary Examiner.*